United States Patent [19]

Teshirogi

[11] Patent Number: 5,894,360

[45] Date of Patent: Apr. 13, 1999

[54] LIQUID CRYSTAL DISPLAY HAVING AN SIO₂ FLATTENING LAYER

[75] Inventor: Toshiyuki Teshirogi, Fukushima-ken, Japan

[73] Assignee: Alps Electric Co., Ltd., Tokyo, Japan

[21] Appl. No.: 08/905,680

[22] Filed: Aug. 4, 1997

Related U.S. Application Data

[63] Continuation of application No. 08/585,328, Jan. 11, 1996, abandoned.

[30] Foreign Application Priority Data

Jan. 17, 1995 [JP] Japan .................. 7-005057

[51] Int. Cl.⁶ .................. G02F 1/1335; G02F 1/1333
[52] U.S. Cl. .................. 349/122; 349/106; 349/138
[58] Field of Search .................. 359/68; 349/122, 349/106, 138

[56] References Cited

U.S. PATENT DOCUMENTS

| | | | |
|---|---|---|---|
| 4,690,511 | 9/1987 | Watanabe | 359/68 |
| 4,935,757 | 6/1990 | Hatano et al. | 359/68 |
| 5,040,875 | 8/1991 | Noguchi | 359/68 |
| 5,236,793 | 8/1993 | Nishiwaki et al. | 359/68 |
| 5,396,356 | 3/1995 | Fukuchi | 359/68 |
| 5,420,708 | 5/1995 | Yokoyama et al. | 349/122 |
| 5,463,484 | 10/1995 | Brody | 349/122 |

FOREIGN PATENT DOCUMENTS

| | | | |
|---|---|---|---|
| 2-37327 | 2/1990 | Japan | 359/68 |
| 2-170131 | 6/1990 | Japan | 359/68 |
| 4-181216 | 6/1992 | Japan | |
| 604903 | 7/1994 | Japan | 359/68 |

*Primary Examiner*—William L. Sikes
*Assistant Examiner*—Tiep H. Nguyen
*Attorney, Agent, or Firm*—Brinks Hofer Gilson & Lione

[57] ABSTRACT

A full-color liquid crystal display which is simple in construction and low in costs, also providing high quality of display performance. The liquid crystal display has a color filter substrate, an opposing substrate, and a liquid crystal charged between both the substrates. The color filter substrate includes a transparent substrate. A transparent electrode is mounted on one surface of the transparent substrate. A color filter is electro-deposited on the transparent electrode. A light-shielding film is formed in clearances provided for the color filter. An inorganic dielectric film is mounted on the surfaces of the color filter and the light-shielding film. A transparent electrode film is deposited on the dielectric film. On the other hand, the opposing substrate is constructed of a transparent substrate and a transparent electrode adhering to one surface of the substrate. As the liquid crystal, a nematic liquid crystal whose molecular longer axis is progressively twisted at 90° between the transparent electrode films provided for the color filter substrate and the opposing substrate, respectively, is charged.

6 Claims, 1 Drawing Sheet

PRIOR ART

LIQUID CRYSTAL DISPLAY HAVING AN SIO₂ FLATTENING LAYER

This application is a continuation of application Ser. No. 08/585,328, filed Jan. 11, 1996 now abandoned.

BACKGROUND OF THE INVENTION

1. Field of the Invention

The present invention relates to a color liquid crystal display and, more particularly, to the structure of a color filter substrate having a color filter

2. Description of the Related Art

FIG. 2 illustrates an example of the construction of a conventional full-color liquid crystal display. FIG. 2 shows that this liquid crystal display largely comprises a color filter substrate 21, an opposing substrate 22 and a liquid crystal 23 disposed between both the substrates 21 and 22.

The color filter substrate 21 comprises a transparent substrate 24, a transparent electrode 25 formed on one surface of the transparent substrate 24, a color filter 26 electro-deposited on the transparent electrode 25, a light-shielding film 27 formed in clearances provided for the color filter 26, a flattening film 28 mounted on the surfaces of the color filter 26 and the light-shielding film 27, an inorganic dielectric film 29 stacked on the flattening film 28, and a transparent electrode film 30 adhering onto the inorganic dielectric film 29. On the other hand, the opposing substrate 22 is constructed of a transparent substrate 31 and a transparent electrode 32 formed on one surface of the transparent substrate 31.

The flattening film 28, which is formed from a transparent resin material, such as polyvinyl alcohol, an ultraviolet-curing resin or the like, is provided for flattening the surfaces of the color filter 26 and the light-shielding film 27 and also keeping at a constant spacing (gap) between the transparent electrode film 30 and the transparent electrode 32, thereby improving nonuniformity in color and inconsistencies in the display and response performance. In contrast, the inorganic dielectric film 29, which is formed from a transparent inorganic dielectric, for example, SiO₂, is disposed for enhancing the adhesion of the electrode film 30 and other characteristics.

However, the conventional full-color liquid crystal display discussed above presents the following problem. After the formation of the color filter 26 and the light-shielding film 27, the resin-formed flattening film 28 and the inorganic dielectric film 29 are required to be sequentially mounted on the surfaces of the color filter 26 and the shielding film 27. This increases the complexity of the manufacturing process and raising the manufacturing costs.

SUMMARY OF THE INVENTION

Accordingly, in order to solve the above-described problem inherent in the prior art, it is an object of the present invention to provide a full-color liquid crystal display which is simple in construction and low in costs, yet providing the high quality of display performance.

In order to achieve the above object, the present invention provides a liquid crystal display including a color filter substrate, an opposing substrate, and a liquid crystal charged between the substrates, wherein the improvement comprises that the color filter substrate is obtained by directly forming an inorganic dielectric film on a color filter and depositing a transparent electrode film on the dielectric film, and that a nematic liquid crystal (TN liquid crystal) is charged between the transparent electrode film provided for the color filter substrate and another transparent electrode film provided for the opposing substrate, the molecular longer axis of the nematic liquid crystal being progressively twisted at 90 degrees between the electrode films.

If a nematic liquid crystal whose molecular longer axis is progressively twisted in a range from 180° to 270° between transparent electrode films (STN liquid crystal) is charged, the high quality of display performance cannot be ensured unless strict adjustments are made to the gap between the films within tolerances of 6 μm±0.02 μm. This inevitably necessitates a flattening film disposed on the surfaces of the color filter and the light-shielding film.

In contrast, studies made by the present inventors have shown that by use of the TN liquid crystal, the quality of display performance cannot be adversely influenced by the degree of variations in the gap resulting from the surface roughness of the color filter and the shielding film. This obviates the necessity for a flattening film. This elimination significantly simplifies the manufacturing process, which further leads to a reduction in the manufacturing costs of the liquid crystal display. Also, the display can be free from other detrimental problems, such as a deterioration in the adhesion of the transparent electrode film, since the film is formed on the inorganic dielectric film.

DESCRIPTION OF THE PREFERRED EMBODIMENT

Figure 1:
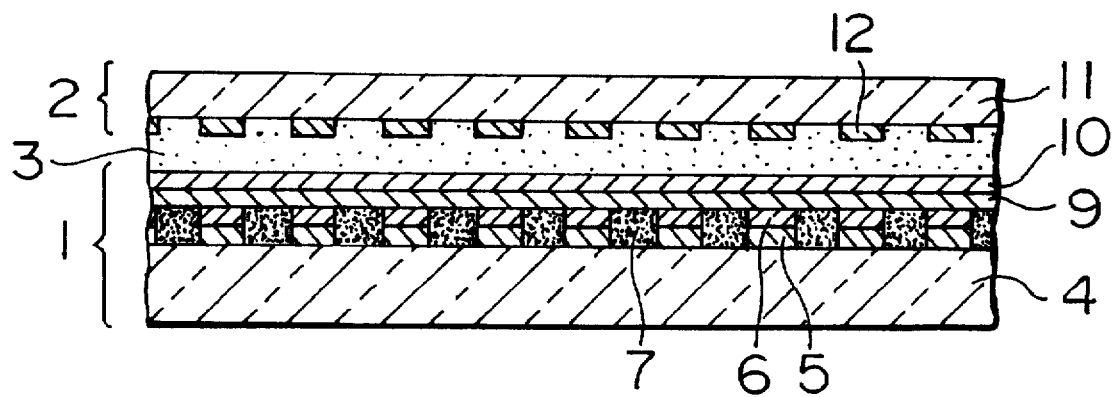
FIG. 1 is a sectional view of the essential portion of a liquid crystal display according to the present invention.
Figure 2:
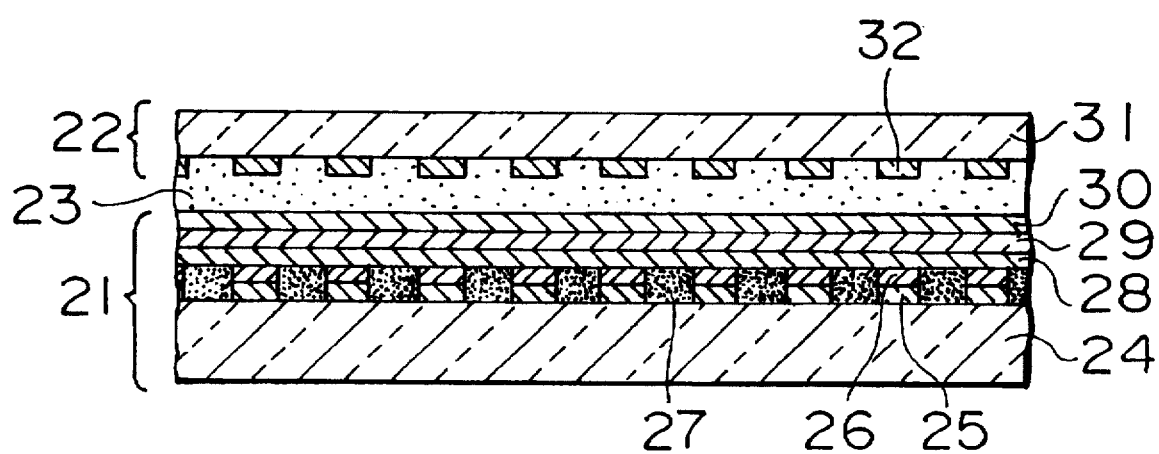
FIG. 2 is a sectional view of the essential portion of a conventional liquid crystal display.

An embodiment of the present invention will now be described with reference to FIG. 1. FIG. 1 shows that a liquid crystal display of this embodiment, as well as the conventional liquid crystal display as discussed above, primarily comprises a color filter substrate 1, an opposing substrate 2, and a liquid crystal 3 sandwiched between both the substrates 1 and 2.

The color filter substrate 1 comprises a transparent substrate 4, a transparent electrode 5 formed on one surface of the transparent substrate 4, a color filter 6 electrodeposited on the transparent electrode 5, a light-shielding film 7 formed in clearances provided for the color filter 6, an inorganic dielectric film 9 mounted on the surfaces of the color filter 6 and the light-shielding film 7, and a transparent electrode film 10 deposited on the dielectric film 9. On the other hand, the opposing substrate 2 is constructed of a transparent substrate 11 and a transparent electrode 12 deposited on one surface of the transparent substrate 11. In this manner, the liquid crystal display of this embodiment is constructed without disposing a flattening film on the surfaces of the color filter 6 and the light-shielding film 7, which is provided for the conventional liquid crystal display.

The transparent substrates 4 and 11 are formed of hard transparent materials, such as glass plates or the like. The transparent electrodes 5 and 12 and the transparent electrode film 10 are made of transparent conductive materials, such as ITO (Indium Tin Oxide) or the like. Among these, the transparent electrodes 5 and 12 are constructed by groups of linearly-extending narrow conductive films that are disposed parallel to each other at regular intervals. In contrast, the transparent electrode film 10 is evenly deposited on the inorganic dielectric film 9.

The color filter 6 is mounted on each transparent electrode portion 5 according to a suitable method employing electrodeposition, dyeing, printing or the like. The use of the methods other than the electrodeposition method eliminates the need for the transparent electrode 5. The light-shielding film 7, serving to prevent the light leakage from the clearances provided for the color filter 6, is formed from a photosensitive material blended with black pigments.

The inorganic dielectric film 9, used for enhancing the adhesion of the transparent electrode film 10, is formed from a transparent inorganic dielectric, for example, $SiO_2$ according to a vacuum film-forming method employing sputtering, vacuum deposition or the like. The thickness of the film is preferably formed larger to improve the flatness of the surfaces of the color filter 6 and the light-shielding film 7, though it can be set as desired according to the necessity.

As the liquid crystal 3, a nematic liquid crystal whose molecular longer axis is progressively twisted at 90° is charged between the transparent electrode film 10 and the transparent electrode 12. In this manner, the TN (twisted nematic) liquid crystal display is formed Unlike STN liquid crystal displays, the high quality of display performance can be obtained for TN liquid crystal displays without requiring strict control over the gap between the electrode films nor necessitating the formation of a flattening film on the surfaces of the color filter 6 and the light-shielding film 7. The elimination of a flattening film remarkably simplifies the manufacturing process, which further leads to a reduction in the manufacturing costs of the liquid crystal displays. On the other hand, the liquid crystal display are free from detrimental problems, such as a deterioration in the adhesion of the transparent electrode film 10, since the film 10 is formed on the dielectric film 9.

FIG. 1 and an explanation thereof merely illustrate an embodiment of the present invention, but are not exclusive. For example, the materials and the arrangements of the respective components of the display can be suitably varied as required, and the presence of the light-shielding film can also be appropriately selected.

As will be clearly understood from the foregoing description, the present invention offers the following advantages.

The provision of a flattening film is omitted, thereby significantly simplifying the manufacturing process and reducing the manufacturing costs of the liquid crystal display. Also, a nematic liquid crystal whose molecular longer axis is twisted at 90° is charged between the transparent electrode films so as to form a TN liquid crystal display. Accordingly, the high quality of display performance can be obtained without requiring the provision of a flattening film for the liquid crystal display. Also, the transparent electrode film, which is formed on the inorganic dielectric film, can maintain good adhesion.

What is claimed is:

1. A liquid crystal display comprising:

a first substrate structure including a first transparent substrate and a plurality of first transparent electrodes formed on a surface of the first transparent substrate;

a second substrate structure including:
   a second transparent substrate,
   a plurality of color filters, each of said color filters being formed adjacent a surface of the second transparent substrate,
   an inorganic dielectric film laminated directly onto a surface of said plurality of color filters, said inorganic dielectric film comprising $SiO_2$ and having a thickness set such that the inorganic dielectric film forms a flat upper surface over said plurality of color filters, and
   a continuous transparent electrode film deposited on said inorganic dielectric film; and a charged liquid crystal located between the plurality of first transparent electrodes and the transparent electrode film;

wherein the charged liquid crystal is a nematic liquid crystal having a molecular longer axis twisted at 90°.

2. A liquid crystal display according to claim 1, wherein a plurality of second electrodes are formed on a surface of the second transparent substrate, and each of the plurality of color filters is formed on one of the plurality of second electrodes.

3. A liquid crystal display according to claim 1 further comprising a light-shielding film located between each adjacent pair of the plurality of color filters.

4. A liquid crystal display comprising:

a first substrate structure including a first transparent substrate and a plurality of first transparent electrodes formed on a surface of the first transparent substrate;

a second substrate structure including:
   a second transparent substrate,
   a plurality of color filters, each of said color filters being formed adjacent a surface of the second transparent substrate,
   an inorganic dielectric film laminated directly onto a surface of said plurality of color filters, said inorganic dielectric film comprising $SiO_2$ and having a thickness set such that the inorganic dielectric film forms a flat upper surface over said plurality of color filters, and
   a continuous transparent electrode film deposited on said inorganic dielectric film; and a charged liquid crystal located between the plurality of first transparent electrodes and the transparent electrode film;

wherein the charged liquid crystal is a nematic liquid crystal.

5. A liquid crystal display according to claim 4, wherein a plurality of second electrodes are formed on a surface of the second transparent substrate, and each of the plurality of color filters is formed on one of the plurality of second electrodes.

6. A liquid crystal display according to claim 4 further comprising a light-shielding film located between each adjacent pair of the plurality of color filters.

* * * * *